United States Patent
Sink et al.

(10) Patent No.: US 6,270,916 B1
(45) Date of Patent: Aug. 7, 2001

(54) COMPLETE DISCHARGE DEVICE FOR LITHIUM BATTERY

(75) Inventors: Michael S. Sink, Boone, NC (US); Glen V. Bowling, New Milford, CT (US)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/220,849

(22) Filed: Dec. 28, 1998

Related U.S. Application Data

(63) Continuation-in-part of application No. 08/827,680, filed on Apr. 10, 1997, now abandoned.

(51) Int. Cl.[7] ............................. H01M 6/52; H01M 2/34
(52) U.S. Cl. ................................ 429/7; 429/49
(58) Field of Search ................. 429/7, 50, 101, 429/102, 105, 49; 320/127, 132

(56) References Cited

U.S. PATENT DOCUMENTS

| | | | |
|---|---|---|---|
| 4,184,007 | * 1/1980 | Urry | 429/8 |
| 4,407,909 | * 10/1983 | Gobel | 429/50 |
| 4,407,910 | * 10/1983 | Cantanzarite | 429/57 |
| 4,448,859 | * 5/1984 | Bishop et al. | 429/50 |
| 5,119,009 | * 6/1992 | McCaleb et al. | 320/13 |

* cited by examiner

Primary Examiner—Carol Chaney
(74) Attorney, Agent, or Firm—Sughrue, Mion, Zinn, Macpeak & Seas, PLLC

(57) ABSTRACT

A method and apparatus for completely discharging a $LiSO_2$ battery which is not prone to self-activation and which does not require special tools for activation. In the present invention, as switch is formed of a switch contact (e.g,. a spring contact) biased toward a contact pad. When the contact and contact pad meet, the discharge circuit of the complete discharge device (CDD) is activated. Under normal conditions, an elongated insulative strip projects between the switch contact and the contact pad and extends through the casing of the battery. The extension allows the strip to be pulled out from the exterior of the casing. Also under normal conditions, the portion of the strip extending through the casing is folded over and covered with a peel-off label. When it is desired to activate the complete discharge device, the peel-off label is removed to expose the end of the strip, and the strip can be withdrawn from the casing. This then allows the contact and the contact pad to touch and activate the CDD.

24 Claims, 1 Drawing Sheet

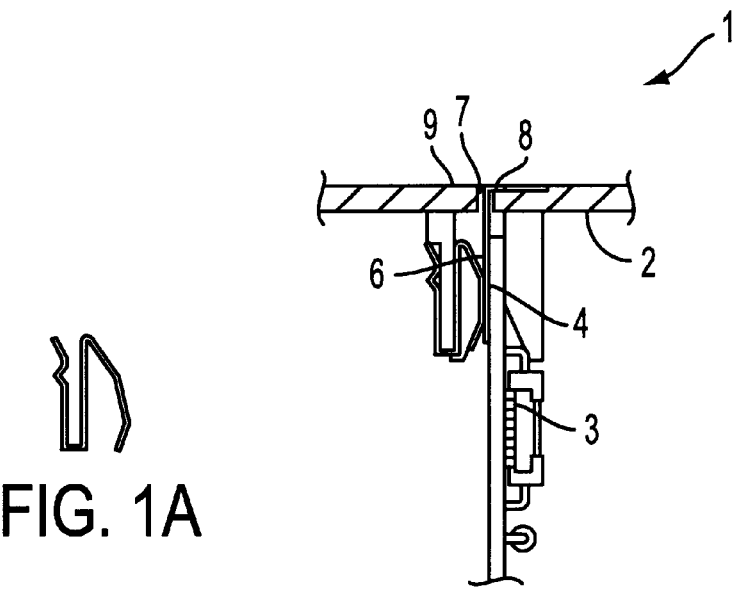
FIG. 1A
FIG. 1B
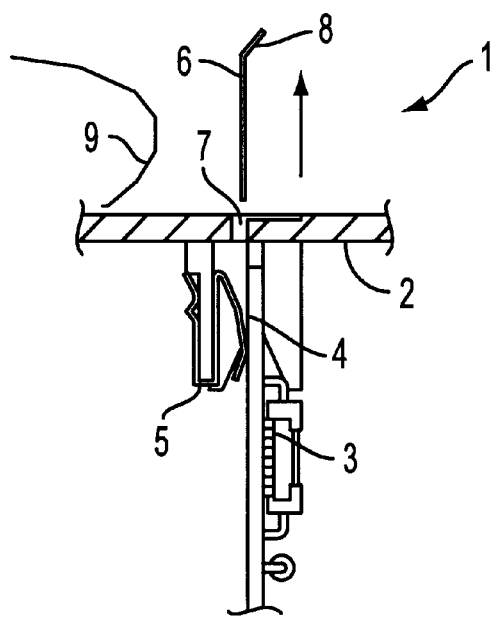
FIG. 2

COMPLETE DISCHARGE DEVICE FOR LITHIUM BATTERY

This application is a continuation-in-part of application Ser. No. 08/827,680 filed on Apr. 10, 1997, now abandoned.

BACKGROUND OF THE INVENTION

The present invention relates generally to a method and apparatus to completely discharge a $LiSO_2$ battery.

$LiSO_2$ batteries require complete discharge prior to disposal. This is typically accomplished by a Complete Discharge Device (CDD). A CDD, typically a switch, can be actuated to complete a discharge circuit. When the battery is subject to physical abuse, self-activation, resulting in unintended battery discharge, may result if the switch need simply be depressed or slid from one position to another. One manner of preventing self-activation is to design the discharge actuator such that a special tool is required to activate the discharge function. However, such a system is cumbersome to use.

An example of such a cumbersome device is described in U.S. Pat. No. 4,965,505 which relates to the deactivation of a lithium battery by means of a switch. The discharge switch is activated by inserting an elongated object into an aperture located in the battery casing. The inserted object presses one contact against another, thereby closing the discharge circuit. While such a manner of discharging is substantially immune from self-activation, the use of a separate object to be inserted into the battery casing suffers from the drawback of being cumbersome to operate when desired.

SUMMARY OF THE INVENTION

The present invention is directed to a method and apparatus for completely discharging a $LiSO_2$ battery.

It is an object of the present invention to provide a method and apparatus for completely discharging a $LiSO_2$ battery which is not prone to self-activation under physical abuse conditions.

It is another object of the present invention to provide a method and apparatus for completely discharging a $LiSO_2$ battery which does not require special tools for activation.

In order to realize the above objects, the present invention provides a method and apparatus in which a CDD actuator is used which is not prone to self-activation under physical abuse conditions. In the present invention, a switch is formed of a switch contact (e.g., a spring contact) biased toward a contact pad. When the contact and contact pad meet, the discharge circuit is activated. Under normal conditions, an elongated insulative strip is situated between the switch contact and the contact pad and extends through an aperture in the casing of the battery to form a tab. The tab allows the strip to be pulled out from the exterior of the casing. Also under normal conditions, the tab portion of the insulative strip extending through the casing is folded over and covered with a peel-off label. When it is desired to activate the CDD, the peel-off label is removed to expose the end of the strip, and the strip can be withdrawn from the casing. This then allows the contact and the contact pad to touch and activate the CDD.

The switch configured according to the present invention may be used as well to activate or inactivate other circuits, components or subsystems in addition to the complete discharge subsystem.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein:

FIG. 1 shows a portion of a battery with a complete discharge device in accordance with the present invention in an unactivated condition.

FIG. 2 shows the same portion of a battery with a complete discharge device in accordance with the present invention in an activated condition.

DETAILED DESCRIPTION OF THE PREFERRED EMBODIMENT

Reference will now be made in detail to the preferred embodiment of the present invention, examples of which are illustrated in the accompanying drawings FIG. 1 shows the complete discharge device in accordance with the present invention in an unactivated condition. Reference numeral 1 refers generally to the portion of the battery shown in FIG. 1 which includes the complete discharge device. A portion of the casing of the battery is depicted at reference numeral 2. Electronic assembly board 3, disposed within the battery casing includes contact pad 4. In order to activate discharging of the battery, contact pad 4 must touch switch contact (e.g. a spring contact) 5, thus the switch contact 5 is biased toward contact pad, 4. In the unactivated condition, an elongated insulative strip 6 is inserted into aperture 7 of the battery casing 2. The insulative strip 6, when inserted into the casing 2 separates contact pad 4 from switch contact 5, thereby preventing activation of the discharging function of the circuit. A tab portion 8 of the insulative strip 6 extends beyond the casing 2 of the battery through aperture 7, and in the unactivated condition, the tab 8 of the insulative strip 6 is bent against the exterior casing 2 of the battery. Aperture 7 and tab 8 are then covered by a peel-off label 9 which adheres to casing 2 of the battery.

FIG. 2 shows the complete discharge device of the present invention in the activated condition. In order to activate the complete discharge circuit, label 9 is peeled off the casing 2 of the battery. FIG. 2 shows the label in the peeled back state. This exposes aperture 7 and tab 8 of the insulative strip 6 extending beyond the casing. The insulative strip 6 is then removed from the battery by pulling tab 8 in the direction shown by the arrow indicated on FIG. 2. When the insulative strip 6 is removed, contact switch 5, which has been biased toward contact pad 4, touches contact pad 4. This then activates the complete discharge circuit allowing for complete discharge of the battery.

In an alternative embodiment, tab 8 is attached to label 9. Thus, when label 9 is peeled off of the battery casing 2, the tab 8 of insulative strip 6 is automatically pulled with the label, thereby eliminating the separate step of manually pulling the tab 8.

It will also be appreciated that the switching arrangement shown in FIGS. 1 and 2 can be used to activate or inactivate virtually any circuit component or subsystem, and is not limited to operation with a complete discharge device. For example, the pull tab switch can be used in conjunction with the fuel gauge (state of charge indicator or SOCI) for use in primary batteries. There is much demand for supplying primary batteries with fuel gauge to maximize the effective use of the available capacity. One of the concerns in adapting SOCI's primary batteries is that the SOCI draws current for the battery to maintain the memory of the remaining capacity even when the battery is inactive. It is common to store lithium primary batteries for more than 5 years prior to use. A significant amount of the available battery capacity would be consumed by the SOCI if stored more than a year. The pull switch according to this invention could be used to activate the SOCI only when the battery is put into use. The pull tab for the activation switch could be placed under a label over the connector which would instruct the user to remove the tab upon initial use of the battery to active the fuel gauge.

In view of the foregoing, it can be seen that the present invention provides a method and apparatus for completely discharging a $LiSO_2$ battery which is not prone to self-activation under physical abuse conditions and which does not require special tools for activation.

It should be understood that the present invention is not limited to any particular embodiment disclosed herein. Many variations of the examples discussed above will still be within the scope and spirit of the invention, as defined by the following claims.

What is claimed is:

1. A method for completely discharging a battery, where said battery comprises a battery casing having an aperture adapted for receiving an elongated insulative strip, and a switch mechanism including a contact pad and a contact switch biased toward said contact pad, wherein in an unactivated condition said elongated insulative strip is inserted into said battery casing through said aperture and is disposed between said contact pad and said contact switch, thereby preventing contact between said contact pad and said contact switch, said insulative strip including a tab portion extending beyond said casing of said battery through said aperture, said battery further comprising a label covering said portion of said insulative strip and said aperture, wherein said method comprises the steps of:

peeling said label off of said battery casing, thereby exposing said tab; and removing said insulative strip from said battery by pulling on said tab, said removing step allowing said contact switch to contact said contact pad thereby activating discharging of said battery.

2. A method for completely discharging a battery, where said battery comprises a battery casing having an aperture adapted for receiving an elongated insulative strip, and a switch mechanism including a contact pad and a contact switch biased toward said contact pad, wherein in an unactivated state said elongated insulative strip is inserted into said battery casing through said aperture and is disposed between said contact pad and said contact switch, thereby preventing contact between said contact pad and said contact switch, said insulative strip including a tab portion extending beyond said casing of said battery through said aperture, said battery further comprising a label covering said tab portion of said insulative strip and said aperture, said tab portion being attached to said label, wherein said method comprises the step of:

peeling said label off of said battery casing, said step of peeling said label causing said tab and elongated insulative strip to be automatically pulled from said battery casing, allowing said contact switch to touch said contact pad thereby activating discharging of said battery.

3. An apparatus for completely discharging a battery, where said battery comprises a battery casing having an aperture, wherein said apparatus comprises:

a switch mechanism disposed within said battery and including a contact pad and a contact switch biased toward should contact pad;

an elongated insulative strip having a tab portion; and a label, wherein in an unactivated condition said elongated insulative strip is inserted in said battery between said contact pad and said contact switch, thereby preventing said contact pad from touching said contact switch, said tab portion of said insulative strip extending beyond said casing of said battery through said aperture, said tab portion and said aperture being covered by said label, and wherein in an activated condition, said label and said elongated insulative strip having been removed, said contact pad touches said contact switch, thereby activating complete discharge of said battery.

4. An apparatus according to claim 3, wherein said tab portion of said elongated insulative strip is attached to said label, thereby allowing automatic removal of said elongated insulative strip when said label is peeled off.

5. An apparatus according to claim 3, wherein said tab portion of said elongated insulative strip is separate from said label, thereby requiring said elongated insulative strip to be manually removed after said label is peeled off.

6. A method according to claim 1, wherein said battery comprises a $LiSO_2$ battery.

7. A method according to claim 2, wherein said battery comprises a $LiSO_2$ battery.

8. An apparatus according to claim 3, wherein said battery comprises a $LiSO_2$ battery.

9. A method for activating a circuit disposed within a battery, said battery including a battery having an aperture adapted for receiving an elongated insulative strip, and a switch mechanism disposed within said battery casing and including a contact pad and a contact switch biased toward said contact pad, wherein in an unactivated condition said the elongated insulative strip is inserted into said battery casing through said aperture and is disposed between said contact pad and said contact switch, thereby preventing contact between said contact pad and said contact switch, said method comprising the step of removing said insulative strip from said battery, thereby allowing said contact switch to contact said contact pad to activate said circuit.

10. A method according to claim 9, wherein said insulative strip includes a tab portion extending beyond said casing of said battery through said aperture, said battery further comprising a label covering said portion of said insulative strip and said aperture, wherein said method further comprises the step of removing said label.

11. A method according to claim 10, wherein said label is attached to said tab portion, whereby removal of said label removes said insulative strip through said aperture.

12. A method according to claim 10, wherein said label is separate from said strip whereby said label is removed prior to removal of said strip through said aperture.

13. An apparatus for activating a circuit disposed within a battery, said battery including a battery casing having an aperture, said apparatus comprising:

an elongated insulative strip, and a switch mechanism disposed within said battery casing and including a contact pad and a contact switch biased toward said contact pad, wherein in an unactivated condition said the elongated insulative strip is inserted into said battery casing through said aperture and is disposed between said contact pad and said contact switch, thereby preventing contact between said contact pad and said contact switch, and in an activated condition said elongated insulative strip is removed and said contact pad touches said contact switch, thereby allowing said contact switch to contact said contact pad to activate said circuit.

14. An apparatus according to claim 13, wherein said insulative strip includes a tab portion extending beyond said casing of said battery through said aperture, said battery further comprising a label covering said portion of said insulative strip.

15. An apparatus according to claim 14, wherein said label is attached to said tab portion, whereby removal of said label removes said insulative strip through said aperture.

16. An apparatus according to claim 14, wherein said label is separate from said strip whereby said label is removed prior to removal of said strip through said aperture.

17. A method for inactivating a circuit disposed within a battery, said battery including a battery having an aperture adapted for receiving an elongated insulative strip, and a switch mechanism disposed within said battery casing and including a contact pad and a contact switch biased toward said contact pad, wherein in an activated condition said elongated insulative strip is inserted into said battery casing through said aperture and is disposed between said contact pad and said contact switch, thereby preventing contact between said contact pad and said contact switch, said method comprising the step of removing said insulative strip from said battery, thereby allowing said contact switch to contact said contact pad to inactivate said circuit.

18. A method according to claim 17, wherein said insulative strip includes a tab portion extending beyond said casing of said battery through said aperture, said battery further comprising a label covering said portion of said insulative strip and said aperture, wherein said method further comprises the step of removing said label.

19. A method according to claim 18, wherein said label is attached to said tab portion, whereby removal of said label removes said insulative strip through said aperture.

20. A method according to claim 18, wherein said label is separate from said strip whereby said label is removed prior to removal of said strip through said aperture.

21. An apparatus for inactivating a circuit disposed within a battery, said battery including a battery casing having an aperture, said apparatus comprising:

an elongated insulative strip, and a switch mechanism disposed within said battery casing and including a contact pad and a contact switch biased toward said contact pad, wherein in an activated condition said the elongated insulative strip is inserted into said battery casing through said aperture and is disposed between said contact pad and said contact switch, thereby preventing contact between said contact pad and said contact switch, and in an inactivated condition said elongated insulative strip is removed and said contact pad touches said contact switch, thereby allowing said contact switch to contact said contact pad to inactivate said circuit.

22. An apparatus according to claim 21, wherein said insulative strip includes a tab portion extending beyond said casing of said battery through said aperture, said battery further comprising a label covering said portion of said insulative strip.

23. An apparatus according to claim 22, wherein said label is attached to said tab portion, whereby removal of said label removes said insulative strip through said aperture.

24. An apparatus according to claim 22, wherein said label is separate from said strip whereby said label is removed prior to removal of said strip through said aperture.

* * * * *